United States Patent

[11] 3,634,094

[72] Inventors George Bernard Ponzoni
 Spring Valley, N.Y.;
 Michael Gabriel Protomastro, Woodridge;
 Arthur Stefanucci, Clifton, both of N.J.
[21] Appl. No. 32,771
[22] Filed Apr. 28, 1970
[45] Patented Jan. 11, 1972
[73] Assignee General Foods Corporation
 White Plains, N.Y.

[54] ROASTING OF NONEQUALLY MOISTURIZED COFFEES
 16 Claims, No Drawings
[52] U.S. Cl. ................................................. 99/68,
 99/65, 99/69
[51] Int. Cl. ........................................................ A23f 1/02
[50] Field of Search ............................................ 99/65, 68

[56] References Cited
UNITED STATES PATENTS
3,106,470 10/1963 Spotholz........................ 99/68
OTHER REFERENCES
Sivetz, Coffee Processing Technology, Vol. II, (1963) pp. 83– 85 & 206.

Primary Examiner—Frank W. Lutter
Assistant Examiner—William L. Mentlik
Attorneys—Jerome J. Norris, Bruno P. Struzzi and Thomas V. Sullivan ABSTRACT: Botanically dissimilar coffees are separately and differently pretreated to contain unequal quantities of water, and thereafter blended and conventionally roasted to provide flavors comparable to those resulting from blending the same nonpretreated dissimilar coffees after separately roasting each type.

ROASTING OF NONEQUALLY MOISTURIZED COFFEES

BACKGROUND OF THE INVENTION

The invention relates to a new and improved process for atmospherically roasting blends of green coffee, in which the different types of coffee constituting the blend have been separately pretreated to enable the blend to roast to superior roast flavors. More particularly, the invention relates to ascertaining the quantity of moisture which each coffee type of the blend must possess, in order to effect the degree of roast necessary to optimize its particular flavor, and consequently the optimum flavor of the blend as a whole.

When roasting blends of coffee, it is acknowledged in the art that the desideratum is the production of blends possessing optimum roast flavors for the overall blend. Heretofore, accomplishment of this objective necessitated a separate roasting of each coffee type intended for use in the composite blend, to permit each type to reach that roast color which correlates to its unique optimum flavor, prior to blending.

The obstacles encountered in a joint roast attempt to attain optimum roast colors and flavors for each coffee type comprising the blend are apparently attributable to the fact that when the optimum roast color of a particular type is reached, the other types are either under roasted or over roasted. As such, blending after separately roasting each coffee type to its optimum desired color and flavor was imperative, if the flavor characteristics of the blend as a whole was to be enhanced along the lines of each coffee-type or grade comprising the blend. For example, the optimum desired color and flavor of Milds coffee beans are realized at a dark roast; for Santos it is a moderate roast; and for Robustas it is a light roast.

The principal object of the invention is to provide a means for each coffee-type in a particular blend to attain its optimum roast color and flavor, upon conjoint roasting of the blend.

A further object of the invention is to provide a means for blending separate types of coffee prior to roasting, to achieve a blended-after-separate-roasting effect, i.e. neither under roasting nor over roasting in the different coffee types.

A yet further object of the invention is to provide a means for substantially increasing the quantity of Robustas or "low grade" coffee includable in a blend-before-roast technique, on composite types of "high grade" (Milds), "moderate grade" (Santos) and "low grade" (Robusta) coffees.

Other objects of the invention will become apparent in the description and examples hereinafter appearing.

SUMMARY OF THE INVENTION

It has now been discovered that separate and dissimilar pretreatment of different coffee types to be used in a composite blend, permits conjoint conventional atmospheric roasting of the blend with the result that each coffee attains a roast color which corresponds to its optimum or most preferred flavor.

Preferably, the effect is accomplished by dehydrating the high grade (Milds) coffee; optionally including and allowing the moisture content of the moderate grade (Santos) coffee to remain as is; and increasing the moisture level of the lower grade (Robusta) coffee. Subsequent to the different separate grade pretreatment, the coffees are blended and atmospherically roasted in a solid cylinder roaster, and quenched by conventional techniques, i.e. immediately immersed in cool air, water sprays, or a combination of cool air and water sprays.

The dissimilar coffee pretreatment techniques of this invention substantially eliminates the under and over roast tendencies of various grades of coffee within the blend, without altering the roasting and quenching conditions, and produces roast flavors superior to those of nonpretreated roasted blends containing the same grades of coffee.

Moreover, in a blend-before-roast technique, it has been found that a level of 18 to 32 percent low grade (Robusta) coffee may be used without roast flavor impairment, in fact, with considerable improvement in roast flavor, upon subjecting the separate grades of coffee to the different pretreatment techniques prior to blending and roasting. Thus, in addition to the unexpected roast flavor improvement, an economic advantage is realized by the increased use of lower cost, low grade (Robusta) coffee in the blend.

DETAILED DESCRIPTION OF THE INVENTION

Generally, the best or most desired flavor which a given type or grade of coffee is capable of producing upon roasting, is realized at a definite roast color. Accordingly, Milds, Santos, or Robusta coffees, prior to blending, would have greater potential to produce optimum roast flavors upon separately roasting each type coffee, rather than joint roasting the blend.

Nevertheless, it has unexpectedly been discovered that the disparity in obtaining optimum flavors from a roast blend formed by separately roasting such coffee comprising the blend, and joint roasting a similar blend is substantially less pronounced or minimal upon separate but different pretreatment of each type coffee intended for use in the blend.

The pretreatment of the Milds type (high grade) coffee entails a dehydration step which decreases the moisture from about 13 percent to between 0.5 and 5 percent (preferably 1 percent); the pretreatment of the Robusta type (low grade) coffee increases its moisture content from about 11 percent to between 15 percent and 25 percent (say 19 percent). The dehydration of Milds tends to accelerate its roast rate within the blend, whereas the increased hydration of Robusta tends to inhibit its roasting rate within the blend. Consequently, the Milds reaches its most desired roast color (dark) sooner, and the Robusta reaches its most desired roast color (light) later. Optionally, a moderate grade of coffee (Santos) can be incorporated in the blend and kept at a conventional moisture level at between 10 percent and 13 percent. In essence, there is a substantial simultaneous occurrence of the most desired roast colors and flavors produced upon conjoint roasting of blends of these pretreated coffees.

Moreover, it has been found that a two-thirds increase of Robusta coffee (low grade) may be tolerated without flavor impairment when the pretreated coffees are conjointly blended before roasting instead of conjointly blending before roasting the same nonpretreated coffees.

The following examples will more specifically set forth the preferred but nonlimiting embodiments of the invention.

EXAMPLE I

A 50/50 blend of Milds and Robusta coffees were pretreated and roasted in the following manner:

The Milds were dehydrated from 13 percent moisture to approximately 1 percent moisture in a forced air oven over a period of 23 hours, at a temperature of 160° F. The Robusta coffee was moisturized from 11 percent moisture to 19 percent over a 23-hour period and a high moisture atmosphere. The separately treated coffees are then blended in 500-lb. lots in a ratio of 50/50, and roasted in a solid cylinder roaster at temperatures ranging from 250° to 600° F., for 9½ to 15 minutes, or for a length of time sufficient to obtain the desired roast color. The hot roasted blend is then removed for conventional quenching in cold air and/or cold water.

A comparison of these pretreated roasted beans with an identical blend of the same beans which were separately roasted prior to blending, disclosed a substantially acceptable similar flavor.

EXAMPLE II

A 50/32/18 blend of Milds, Santos and Robusta coffees were pretreated and roasted in the following manner:

The Milds were dehydrated from 13 percent moisture to approximately 1 percent moisture in a forced air oven over a period of 23 hours, at a temperature of 160° F. The Santos coffee was permitted to remain at between 11—13 percent moisture. The Robusta coffee was moisturized from 11 percent moisture to 19 percent moisture over a 23-hour period and a high moisture atmosphere. The separately treated coffees are then blended in 500-lb. lots in a ratio of 50/32/18, and roasted in a solid cylinder roaster at temperatures ranging from 250° to 600° F., for 9 ½ to 15 minutes, or for a length of time sufficient to obtain the desired roast color. The hot roasted blend is then removed for conventional quenching in cold air and/or cold water.

A comparison of these pretreated roasted beans with an identical blend of the same beans which were separately roasted prior to blending, disclosed a substantially acceptable similar flavor.

EXAMPLE III

A 50/32/18 blend of Milds, Santos and Robusta coffees respectively were prepared and roasted in the following manner:

The pretreatment of example II were dispensed with and the blends were prepared and subsequently roasted in a 500 pound lot in a solid cylinder roaster at temperatures ranging from about 250° to 600° F. for 9½ to 15 minutes, or for a length of time sufficient to obtain the desired roast color. UPon quenching as in example I, a comparison of these roasted beans with an identical blend of the same beans which were separately roasted prior to blending disclosed a wholly dissimilar flavor.

EXAMPLE IV

Same as example II, except that a 50/18/32 blend of Milds, Santos and Robusta coffees were pretreated. The increase of Robusta "low grade" coffee from 18 percent to 32 percent produced no appreciable impairment or degradation of roast flavor.

EXAMPLE V

Same as example II, except that prior to the pretreatment steps the beans are water decaffeinated at temperatures between 100° F. to 120° F., for 6 to 8 hours, according to the process of U.S. Pat. No. 2,309,092.

EXAMPLE VI

Same as example II, except that prior to pretreatment the beans are solvent decaffeinated at temperatures between 80° F. to 120° F. for about 6 hours according to the process of U.S. Pat. Nos. 1,977,416 and 2,381,965, using in addition to the solvents disclosed therein, 1,2-dichlorolethylene.

While the preferred embodiment will constitute separately and differently pretreating dissimilar coffees to provide unequal quantities of moisture in each prior to blending and conjoint roasting, it is to be understood by the skilled practitioner that modifications and variations of the invention may be practiced without departing from the essence and scope of the inventive concept of providing different types of coffees in a common blend, which roast to their optimum color and flavor substantially concurrently.

What is claimed is:

1. A process of roasting a blend of various grades of coffee to produce a blended-after-separate-roast flavor effect comprising modifying the conventional moisture level of at least one grade of coffee by an amount of moisture effective to optimize the roast color nd flavor of that grade after roasting at conditions effective to optimize the roast color and flavor of at least one other different grade of coffee, incorporating said moisture modified grade of coffee with said other grade of coffee to form a blend and roasting said blend at said conditions.

2. The process of claim 1 wherein the conventional moisture level of the modified grade of coffee is increased to between 15 percent to 25 percent moisture by incorporating water therein said modified grade being low grade coffee.

3. The process of claim 1, wherein the conventional moisture level of the modified grade of coffee is decreased to between 0.5 and 5.0 percent moisture by dehydration said modified grade being high grade coffee.

4. The process of claim 1, wherein the modifying step consists of dehydrating a high grade coffee to between 0.5 and 5.0 percent moisture, and increasing the moisture content of a low grade to between 15 and 25 percent.

5. The process of claim 4, wherein the high grade coffee is dehydrated to about 1 percent moisture and the low grade coffee is increased to about 9 percent prior to blending and roasting.

6. The process of claim 4, wherein the blend contains a moderate grade coffee having a moisture of between 10 and 13 percent.

7. The process of claim 6, wherein the high, moderate, and low grade coffees are Milds, Santos, and Robustas respectively.

8. The process of claim 6, wherein the Robustas are present at levels between 18 to 32 percent of the blend.

9. The process of claim 6, wherein the beans are solvent decaffeinated prior to pretreatment.

10. The process of claim 6, wherein the beans are water decaffeinated prior to pretreatement.

11. A blend of various grades of green coffee wherein at least one grade has a modified moisture level different from its conventional moisture level, said modified moisture level being effective to optimize the roast color and flavor of that grade upon roasting at conditions effective to optimize the roast color and flavor of at least one other different grade in said blend.

12. The blend of claim 11, wherein the modified moisture level of said one grade is between 15 to 25 percent water, said one grade being low grade coffee.

13. The blend of claim 11, wherein the modified moisture level of said one grade is between 0.5 and 5.0 percent water said one grade being high grade level.

14. The product of claim 11, wherein the blend is Milds and Robusta coffee beans and the modified moisture levels constitutes between about 0.5 to 5.0 percent moisture in said Milds and between about 15 to 25 percent in the Robusta.

15. The blend of claim 14, wherein the moisture level of the Milds is about 1 percent, the moisture level of the Robustas is about 19 percent, and said Robustas constitutes 18 to 32 percent of the blend.

16. The blend of claim 15, wherein the green coffee is decaffeinated.

* * * * *